Jan. 16, 1945.　　G. F. KEELERIC　　2,367,286
ABRASIVE ARTICLE
Filed June 22, 1943　　2 Sheets-Sheet 1
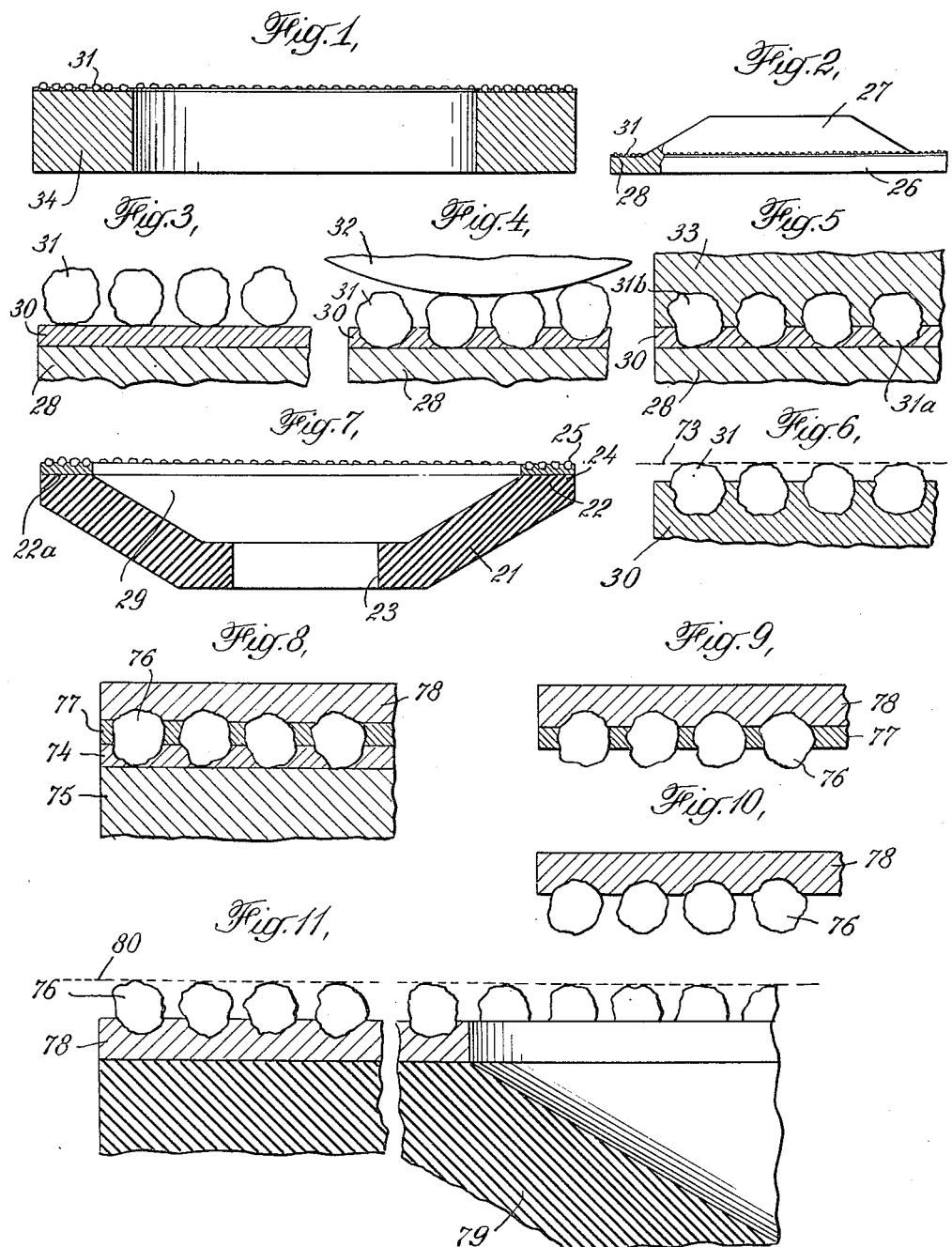

Jan. 16, 1945. G. F. KEELERIC 2,367,286
ABRASIVE ARTICLE
Filed June 22, 1943 2 Sheets-Sheet 2
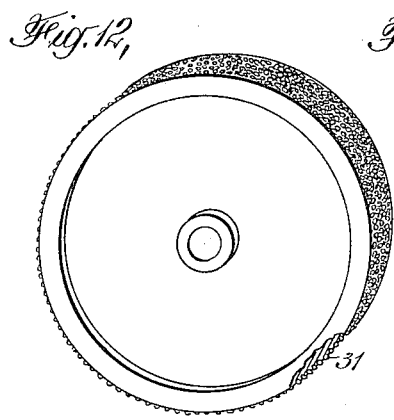
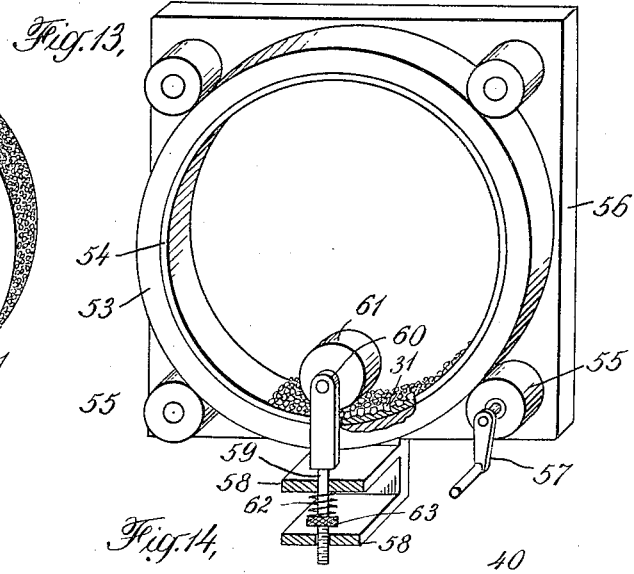
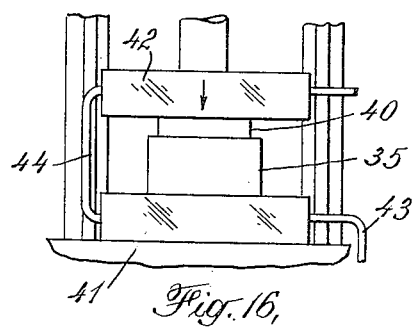
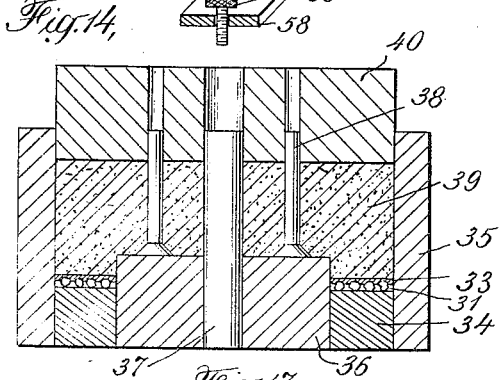
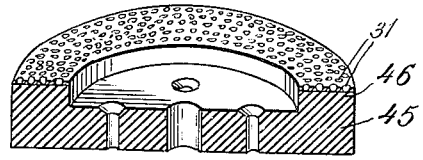
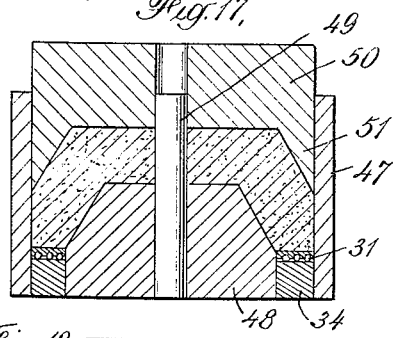
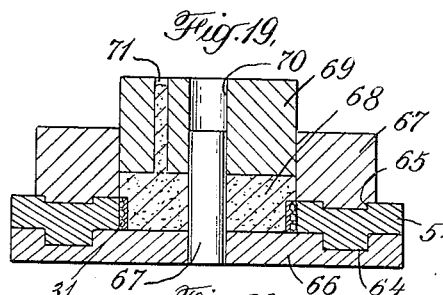
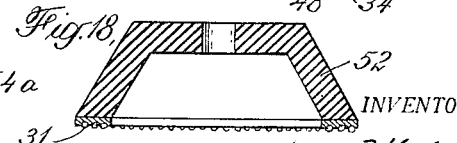
INVENTOR.
George F. Keeleric
BY Pennie Davis Marvin Edmonds
ATTORNEYS Patented Jan. 16, 1945

2,367,286

UNITED STATES PATENT OFFICE 2,367,286

ABRASIVE ARTICLE

George F. Keeleric, Westboro, Mass.

Application June 22, 1943, Serial No. 491,827

10 Claims. (Cl. 51—309)

This invention relates to abrasive articles or tools employed for cutting and grinding purposes and including a base or body having a thin superficial layer of abrasive particles on its working surface. More particularly, the invention has to do with a novel abrasive tool, which is superior to prior similar articles in that the particles are held in place by being partially embedded and anchored in a layer of bonding metal with the outermost portions of the particles projecting from the layer all lying in a grinding surface. Because of being mounted in such positions, the particles all take part simultaneously in the grinding or cutting action and they are so bound in place that they cannot be readily dislodged in use. The invention further includes a novel method by which such an article or tool may be produced in a variety of forms at relatively low cost.

Grinding or cutting instruments of the type referred to have been made heretofore by a number of methods, in one of which the working surface of the base of the instrument is first coated with adhesive, the particles are distributed thereon and a layer of bonding metal is thereafter applied to the base by electrodeposition to bind the particles in position. In the practice of this method, difficulties have been encountered in obtaining a proper distribution of the particles and in holding them in place until the bonding metal is applied. Also, since the particles rest upon the surface of the body and vary in size, they do not project equal distances above the bonding layer and their outermost portions do not lie in the same surface. Accordingly, in the use of such an instrument, the particles do not all take part in the grinding operation at the same time; instead, the particles of maximum projection initially do all the work and, at no time, are all the particles functioning simultaneously.

In another method of making such instruments that has been proposed, the working surface of the base or body of the tool is coated with a layer of soft metal, the particles are forced into the layer, and a layer of bonding material is applied over the soft metal and around the particles. This method has the disadvantage that the soft metal may flow under the conditions of use with the result that the bonding layer and particles are torn free. Also the particles again project beyond the bonding layer to different extents and thus do not take part simultaneously in grinding or cutting.

The present invention is, accordingly, directed to the provision of a novel abrasive instrument including a base or body having a thin superficial layer of abrasive particles on its working surface, which is superior to similar instruments in both cutting action and durability. In the new instrument, the particles are firmly anchored in a layer of bonding metal and, for this purpose, portions of the particles are wholly embedded in and held fast by the layer. Other portions of the particles project out of the layer and the outermost portions of the particles all lie in a surface, which may be conveniently referred to as the "grinding surface." The shape of the grinding surface of any particular instrument depends on the shape and construction of the instrument and its intended manner of use. Thus, for example, in the case of side cutting wheels, the grinding surface is a plane of revolution, while the grinding surface of an edge cutting wheel is a portion of a cylinder concentric with the axis of rotation of the wheel. Similarly, the grinding surface of a hone may be a section of a cylinder or a plane. With all the particles in the new instrument having portions lying in the grinding surface, the particles all take part at the same time in the grinding operation and the instrument, therefore, functions with greater efficiency than prior similar instruments.

The invention further comprehends a new method for making abrasive implements, by the use of which uniformity of projection of the particles from the bonding layer can be readily obtained, even though the particles vary considerably in size. The use of the new method also facilitates the production of instruments that are evenly balanced so that they will run true at high speeds.

For a better understanding of the invention, reference may be had to the accompanying drawings, in which Fig. 1 is a view in vertical section of a blank used in practicing the new method in the production of a side cutting wheel;

Fig. 2 is a view in elevation and with parts broken away, of a blank used in the production of a cup wheel;

Figs. 3, 4, and 5 are sectional views, showing different stages in the practice of the method involving the use of the blanks shown in Figs. 1 and 2;

Fig. 6 is a sectional view showing a portion of the bonding layer with the particles partially embedded therein;

Fig. 7 is a view in transverse section of a completed cup wheel constructed in accordance with the invention;

Fig. 8 is a sectional view through a part of a blank and bonding layer showing a modification of the method;

Figs. 9 and 10 are sectional views through an abrasive member comprising the bonding layer and abrasive particles embedded therein, the views illustrating different stages in the manufacture;

Fig. 11 is a sectional view on an enlarged scale of a portion of a cup wheel which is provided with the abrasive member shown in Fig. 10;

Fig. 12 is a view in perspective of an edge cutting wheel constructed in accordance with the invention;

Fig. 13 is a view in perspective, illustrating the application of abrasive particles to the blank used in the production of the edge cutting wheel of Fig. 12;

Fig. 14 is a view in section of part of the molding apparatus used for forming a side cutting wheel;

Fig. 15 is a view in side elevation of the complete molding apparatus;

Fig. 16 is a sectional perspective view of the side cutting wheel produced by the molding operation carried on by the apparatus of Figs. 14 and 15;

Fig. 17 is a view similar to Fig. 14 showing part of the molding apparatus used for the production of a cup wheel;

Fig. 18 is a sectional view through the cup wheel produced by the use of the apparatus of Fig. 17;

Fig. 19 is a sectional view through apparatus employed in the formation of an edge cutting wheel; and Fig. 20 is a sectional view through the edge cutting wheel produced by the use of the apparatus of Fig. 19.

The new method may be employed in the production of cutting instruments of various forms and the drawings illustrate rotary grinding tools or wheels of various types and show the manner in which such wheels are formed in accordance with the practice of the new method. In the drawings, the particles are shown as disproportionately large for purposes of clarity.

The tool illustrated in Fig. 7 is a cup wheel, which consists of a concave cup-like base or body 21 of any suitable material, such, for example, as a hard plastic substance. The use of plastic for the purpose is desirable, particularly in wheels of large diameter, because it is lighter in weight than metal. The body of the wheel is provided with a rim 22 having an annular working surface 22a and the body has an axial opening 23 for receiving a shaft. Attached to the surface 22a of the wheel is a layer 24 of bonding metal, which is tough or hard or both tough and hard and is preferably of relatively high melting point. The bonding layer is of substantial thickness and in it are mounted abrasive particles 25, which may be of any of the usual abrasive materials, with diamond dust preferred. The particles have portions wholly embedded and anchored in the bonding layer, and other portions which project outwardly therefrom. The outermost portions of the particles lie in the grinding surface which, in this instance, is a plane.

The size of the particles employed and the extent of their exposure beyond the bonding layer depend on the use to which the tool is to be put. In the case of diamond dust, the particles may vary from 60 to 220 mesh, although coarser as well as finer particles may be also used in the production of the new tools. In a tool to be employed for hard metal cutting or grinding, a relatively small projection of the particles beyond the bonding layer is desirable; whereas in a tool to be used on ceramic material or glass, the particles may have a greater projection. For average purposes, about one-third of the length of the particles is a suitable maximum exposure.

In the production of a wheel of the type shown in Fig. 7, there may be employed a blank 26, which has a portion 27 of frusto-conical shape and is provided with a flange 28 having a flat upper surface. The frusto-conical portion of the blank has a shape corresponding to the concavity 29 of the wheel and the flat upper surface of the flange 28 is of the same shape and size as the annular working surface of the cup. The blank is made of a hard material and is preferably of hardened steel.

In the practice of the new method, the first step is that of applying a thin layer of a soft material 30 to the upper surface of the flange of the blank. The soft layer is of uniform thickness and it may be made of various materials, such as soft metals and alloys, as, for example, lead, copper, tin, etc. The layer may also be made of a relatively soft resin, such as an uncured resin, if desired. The layer may be advantageously applied by electrodeposition, since that method of application makes it possible to produce a layer of uniform and controlled thickness, although other methods, such as spraying, may also be used. Preferably, the layer is made of electrodeposited lead, since that metal applied by electrodeposition has been found to give satisfactory results.

Before the soft layer is applied, the thickness of the layer to be used is determined, and for this purpose, a sample of the abrasive material may be examined under the microscope and the average length of the particles noted. The particles used have been preliminarily screened, so that they will all pass through a screen of one mesh and be caught on a screen of a smaller mesh. Particles thus screened and lying between relatively close screen sizes are available commercially and it is also possible to obtain equidimensional particles, although the use of the latter particles is not necessary in the practice of the invention. The thickness of the layer 30 employed corresponds to the maximum length of the portions of the particles to be exposed at the working surface of the tool and thus varies with the size of the particles and the exposure thereof that is desired.

After the soft metal layer has been applied to the blank, the particles are distributed thereover in any suitable way, as, for example, by hand or by electrostatic action, and in any suitable density or arrangement. When the particles are distributed manually, they are placed upon the surface of the soft layer and then brushed or otherwise distributed over the surface to produce the desired concentration.

When the electrostatic means are to be employed, the particles are distributed on the surface of an electrode and the blank is placed thereover with its soft layer opposed to and in alignment with the layer of particles. Current is then applied to the electrode and this throws the particles evenly against the layer. The blank and electrode are then inverted while held in their relative positions and with the current on. When the positions of the blank and electrodes have been reversed, the current is cut off and the electrode removed. When this method of distribution is employed with non-equidimensional particles, the particles are oriented so as to lie with their long axes normal to the surface of the layer while under the influence of the electrostatic field.

In still another method of applying the particles to the soft layer, the surface of the layer is coated with a suitable adhesive material, such as "Vaseline," and the coated surface is then brought down upon a layer of the particles spread out uniformly, for example, on a sheet of paper. Also, the particles may be distributed on the adhesively coated surface by electrostatic action, if desired. The adhesive coating retains the particles in place temporarily, but the adhesive must be removed at a later stage in the operations.

After the layer of particles 31 has been placed on the surface of the soft layer 30, the particles are forced into and through the layer and into contact with the flat surface of flange 28 of the blank beneath the layer. For this purpose a pressing tool is used and the tool may be a hard surfaced roller 32 or a pressing block with a flat surface. After the particles have been subjected to pressure by the roller or block. the particles make contact with the surface of flange 28, as shown in Fig. 4. The lowermost portions of the particles then lie in a surface, the shape of which is determined by the nature of the surface of the flange. If the soft layer is made of metal, the blank with the particles embedded in the soft layer is ready for the next operation, but if the soft layer is made of uncured resin, the layer is first subjected to a curing treatment.

The next step in the method is that of treating the surface of the soft layer preliminary to applying the bonding metal. In the case of a soft layer made of metal, the surface is rendered unclean, as by treatment with a chemical or by application of graphite, to place the surface in such condition that metal applied thereto may be readily removed. If the soft layer is made of resin, the treatment serves the same purpose and. in case the bonding metal is to be applied by electrodeposition, the surface of the layer is rendered conductive in the treatment.

When the soft layer has thus been prepared, the bonding metal 33 is applied in amount sufficient to extend outwardly beyond the outermost portions of the particles, as shown in Figs. 5 and 11, so as to wholly enclose the portions of the particles exposed above the soft layer and anchor the particles firmly in the bonding material. The bonding material is preferably applied by electrodeposition, but it may also be applied by spraying or in any other suitable manner to cause the exposed portions of the particles to become enclosed and concealed in a solid homogeneous body of the bonding metal. The bonding metal is in intimate contact with the portions of the particles enclosed by it, and as the particles are of more or less irregular shape those portions of the particles not only are enclosed and concealed by the bonding metal, but actually are interlocked therewith, as also is clearly shown in Figs. 5 and 11.

The bonding material employed in tools for general use is a metal that is relatively tough or hard or both tough and hard. Also, in such tools, it is important that the bonding metal be of relatively high melting point so that it will not smear during use. Iron, nickel, and chromium are examples of metals suitable for bonding purposes, although, in tools for special purposes, such as the wet grinding of glass, softer bonding metals may be used.

The bonding metal is applied to form a body of substantial thickness, which may be of sufficient strength and rigidity to permit it to be secured directly to a holder, although it is usually preferable to form a bonding layer of less mass and to provide it with support by securing it to a base, or backing. For this purpose, the base or backing may be molded to the surface of the layer of bonding material which is beyond the outermost portions of the particles, and such a molding operation is preferably carried on while the bonding layer is in place on the blank with portions of the particles still extending through the soft layer into contact with the surface of the blank. Molding the base or body to the bonding layer while the latter is still in place on the blank prevents warping of the bonding layer and facilitates the formation of a tool that will run true.

In the production of the tool by molding, the apparatus shown in Figs. 14 and 15 may be employed. The apparatus of Fig. 14 is of a form suitable for making a side cutting wheel for which the blank used is the ring 34 shown in Fig. 1. The blank has a flat upper surface corresponding in size and shape to the working surface of the final wheel and it is made of hard metal, such as hardened steel. Preliminary to the molding, the blank is provided with a thin coating of soft material on its upper surface, the particles are forced through the soft layer and into contact with the flat surface of the blank, and a layer of bonding material is applied to enclose the portions of the particles exposed above the soft layer, these operations being carried on as above described.

In forming the body of the side cutting wheel by molding, the blank with the soft layer, the particles embedded therein, and the bonding layer in place is set upon a flat support and a mold member 35, which is of cylindrical form, is placed outside the blank. The mold member fits the periphery of the blank snugly and projects upwardly beyond the surface thereof a substantial distance. Within the central opening in the blank is placed a second mold member 36 which fits the inner surface of the blank snugly and extends above the top of the bonding layer a distance corresponding to the depth of the concavity of the wheel to be produced. Extending upward centrally from the mold member 36 is a rod or pin 37 of the shape of the opening to be formed through the body for attachment of the wheel to a shaft and if desired, other pins 38 may also be mounted on the top of the mold member 36 to form other openings through the body of the wheel.

When the blank and mold members have been assembled as described, a quantity 39 of a suitable plastic material, for example, in powdered or granulated form, is introduced into the space within mold member 35 above the blank and mold member 36. The amount of plastic material used is sufficient to form a wheel body of the desired thickness and will depend, among other things, on the characteristics of the plastic material employed. After the introduction of the plastic, the mold is completed by placing a pressure block 40 upon the body of plastic material. The block fits the inner surface of mold member 35 snugly and is provided with openings into which rods 37 and 38 extend.

The molding operation is performed by application of heat and pressure to the plastic material and, for this purpose, the assembly shown in Fig.

14 is placed upon the platen 41 of a press, which includes a ram 42 mounted above the platen for vertical movement on suitable guides. The platen and ram are heated in any suitable way and may conveniently be made hollow and supplied with steam through lines 43, the line 44 connecting the platen and ram being flexible so as not to interfere with the movement of the ram relative to the platen. With the assembly in place, the ram is lowered into contact with the mold block 40 and, after the plastic material has been heated to the desired temperature, the ram causes the block 40 to compress the plastic material and form it into the body 45 of the tool. In this operation, the layer of bonding material 33 which covers the abrasive particles becomes affixed to the rim 46 of the plastic body.

After completion of the molding operation, the molded wheel and blank are removed from the mold and thereafter the blank and wheel are separated. In this operation, the particles embedded in the bonding layer may be withdrawn from the soft layer and if any of the soft layer adheres to the bonding layer and particles, the soft material may be removed in any suitable way. If the soft material is a metal, the portions adhering to the bonding layer and particles may be dissolved electrolytically, removed by melting, or ground away, and, if grinding is to be resorted to, the soft metal employed is preferably one that is brittle. Since removal of the soft metal from around around the particles is quite easy, it may be desirable to strip the entire soft layer from the blank with the tool and then remove the soft metal later. For this purpose, the blank may be given a flash plating of copper by being dipped in a copper sulphate solution, after which the soft metal is deposited thereon electrolytically. If the soft layer is non-metallic, any portions thereof adhering to the bonding layer and particles after separation of the tool from the blank are removed in any appropriate manner depending on the nature of the soft material. After separation of the tool from the blank and removal of the soft material from around the particles, the surfaces of the tool other than the working surface may be subjected to suitable finishing operations and the tool is then ready for use.

In the formation of a cup wheel by the use of the blank shown in Fig. 2, the bonding metal may be limited to the surface of the flange 28 on the blank and, when the bonding layer is applied by elestrodeposition, the surface of the frusto-conical portion 27 of the blank is shielded so as to prevent deposition thereon. In some instances, however, it may be desirable to provide a metallic lining for the concavity 29 of wheel body 21 and, in that case, the surface of the frusto-conical layer may be treated to render it unclean and a layer of bonding metal of the desired thickness may be plated thereover at the same time that the bonding metal is deposited on the flange 28 to embed the exposed portions of the particles. When the tool is completed, the layer of metal applied to the frusto-conical portion of the blank then forms a lining for the concavity 29 of the tool body.

In the formation of a cup wheel, the blank used may have the shape shown in Fig. 2 or the ring blank 34 of Fig. 1 may be employed. When the Fig. 2 blank is used, the blank forms the bottom of the mold and it is unnecessary to use an inner mold member similar to the member 36, shown in Fig. 14. However, if the cup wheel is made by the use of the ring blank shown in Fig. 1, the blank is placed within a cylindrical molding member 47 and a molding member 48 is placed within the blank. The member 48 has a frusto-conical portion which extends above the top of the blank and has a shape corresponding to that of the concavity of the finished tool. The mold member 48 may be provided with the central rod 49, if desired. The mold assembly is completed by a pressure block 50, which is formed with a peripheral flange 51 of tapering thickness, the shape of the under surface of the block corresponding to the convex surface of the finished wheel. Such a wheel made by the mold assembly of Fig. 17 is shown at 52 in Fig. 18.

In the production of edge cutting wheels by the new method, there is employed a ring blank 53 of hardened steel, the inner surface of the blank having a shape and form corresponding to that of the working surface of the finished wheel. In the use of this blank, a thin layer 54 of soft material is applied to the inner surface of the blank and the abrasive particles are then distributed on the surface of the soft layer and forced therethrough and into contact with the inner surface of the blank. For this purpose, a pressing shoe with a suitably curved pressing surface may be used. Instead, the blank may first be mounted between rollers 55 on a vertical plate 56, one of the rollers having a crank 57. Attached to the lower edge of the plate is a double bracket having upper and lower horizontal members 58. A rod 59 extends through aligned openings in the brackets and is attached at its upper end to the shaft 60 of a roller 61, which lies within the central opening through the blank. A spring 62 encircles the rod and bears at its upper end against the under surface of the upper bracket member 58 and at its lower end against a nut 63 threaded on rod 59. The spring forces roller 61 into contact with the inner surface of blank 53.

In the application of the abrasive material to the inner surface of blank 53 by the device shown in Fig. 13, the blank is mounted on plate 56 and the abrasive material is then deposited on the surface of the soft metal layer 54 at one side of roller 61. As crank 57 is turned to rotate roller 55, the blank 53 is also rotated and the abrasive particles deposited on the surface of layer 54 are forced through the layer and into contact with the inner surface of the blank by the action of roller 61.

In the formation of the body of an edge cutting wheel by molding, the blank 54a employed is preferably provided with a circumferential rib 64 on one face and a corresponding depression 65 on the other face. The blank is first provided on its inner surface with a thin layer of soft material and the particles distributed over the layer and forced therethrough and into contact with the inner surface of the blank, as by means of the apparatus shown in Fig. 13. A layer of bonding metal is then applied over the exposed portions of the particles and, when these operations have been completed, the blank is placed upon a mold member 66 which has a circular recess in its upper surface in which the rib 64 of the blank is received. A rod 67 is mounted centrally of the recess in the mold member 68 and projects upwardly above the member. When the blank 54 has been mounted on mold member 66, cylindrical mold member 67 having a rib in its lower surface of a size to enter the recess 65 in the upper surface of blank 54a is placed on the blank. Plastic material 68 is then introduced into the center of the blank and upon the upper surface of mold member 66 around the rod 67. A pressure block 69 which fits snugly within the mold member 67 is then placed upon the plastic material. This pressure block has a passage 70 therethrough for the reception of the rod 67 and may also have a passage 71 extending through it vertically.

When the mold assembly described has been completed, it is placed in the press shown in Fig. 15 and the plastic is heated and shaped to final form. As it may be difficult to determine the precise amount of plastic needed, the block 69 may be provided with the passage 71, through which any excess of the plastic may be forced upwardly. After the molding operation is completed, the molding members are removed and the blank is separated from the finished tool body as previously described. Any excess material which has been forced up through passage 71 is removed and the surfaces of the body 72 of the finished tool, other than the working surface, may then be finished in any appropriate manner. A passage similar to passage 71 in pressure block 69 may be formed in the other pressure blocks, such as those designated 40 and 50, if desired.

In the completed tool, as shown in Fig. 6, the particles 31 have portions 31a which lie beneath the surface of the bonding layer 30 and are wholly embedded and anchored in the bonding metal. Each particle also has a portion 31b projecting outwardly beyond the surface of the bonding metal and the outermost portions of the particles all lie in a surface which, in the tool illustrated in Fig. 6, is a plane indicated by the broken line 73. The plane referred to is the grinding surface of the tool and, since the outermost portions of all the particles lie in that plane, all the particles take part simultaneously in the grinding action. The tool is, accordingly, of high efficiency and since the material used to anchor the particles is tough or hard or both tough and hard, the likelihood of their being dislodged during use is reduced.

In the tool shown in Fig. 6, the particles have an exposure beyond the bonding layer about one-third of their transverse dimension and this exposure is determined by the thickness of the soft layer in which the particles were embedded prior to the application of the bonding material. If a greater exposure of the particles is desired this may be accomplished by employing a soft layer 30 of greater thickness or by a modification of the method, as follows.

In the modified practice, a thin coating 74 of soft material, such as a soft metal, is first applied to the surface of the hard blank 75 and the particles 76 are then distributed thereover and forced through the soft layer and into contact with the surface of the hard blank, as shown in Fig. 8. Thereafter, a layer 77 of another metal is deposited on the surface of the soft layer, the operation continuing until the combined thickness of layers 77 and 74 is equal to the projection of the particles that is desired. The layer of bonding material 78 is then applied as previously described to enclose the portions of the particles exposed beyond the layer 77 and to form a layer of bonding material of a desired thickness. When the layer of bonding material is ultimately separated from the blank 75, the particles may be withdrawn from layer 74, which remains mainly on the blank, while layer 77 remains in place on the bonding layer 78, or, if the surface of the blank has been appropriately treated, both layers 74 and 77 may adhere to the bonding layer. The layers may then be removed in any appropriate manner, as by dissolving away by acid or by electrolytic action. Layer 74 may be made of lead for the reasons previously given and copper is preferred for the layer 77, because of its easy removal. Instead of employing the intermediate layer 77 to obtain an increased exposure of the particles, the bonding metal may be applied directly to the surface of the soft metal layer 74 and the increased projection of the particles finally obtained by removing as much of the bonding metal from around the particles as may be necessary. This can be conveniently done by electrolytic action.

In a tool, such as a cup wheel 79, provided with an abrasive member consisting of the layer of bonding metal 78 and abrasive particles 76 and formed by the modified practice, the particles are exposed to a greater extent than in the tool illustrated in Fig. 7. The tool of Fig. 11 has particles with about twice the exposure of those of the tool of Fig. 7 and is appropriate for work on glass and ceramic material. The tool of Fig. 11 is of high efficiency because the outermost portions of the particles all lie in the grinding surface indicated by the dotted line 80.

While the application of the method to the production of grinding wheels has been illustrated and described, it will be apparent that it may be employed equally well in the production of such grinding implements as hones. All abrasive instruments made in accordance with the invention include a self-supporting abrasive member, which consists of a layer of bonding metal and abrasive particles having portions wholly embedded in and anchored by the layer. This abrasive member may be attached to a base or backing in various ways, but when the base or body of the tool is to be made of plastic material, it is preferable to mold the body in contact with the abrasive member while the latter is still mounted on the blank, since the blank then provides support for the abrasive member during the molding operation and prevents warping. Tools thus made are found to run true regardless of their size and the molding is a relatively simple operation which can be carried on without difficulty.

While the method of the invention is most advantageously employed in the production of a tool having a single layer of abrasive particles, it will be apparent that, if circumstances require, the tool may have a number of layers of particles. In producing such a tool, the blank is given a coating of soft material, such as lead, particles are distirbuted thereover and embedded therein until they make contact with the blank, and the bonding material is applied. A layer of soft material is then applied to the exposed surface of the bonding material and another layer of particles is distributed on the second soft layer and embedded therein to make contact with the surface of the bonding layer. A second layer of bonding material is then applied and the operations may be continued until the desired number of layers of particles have been built up.

This application is a continuation-in-part of my co-pending application Serial No. 464,851, filed Novmber 7, 1942.

I claim:

1. A method of making an abrasive tool which comprises distributing abrasive particles upon one surface of a layer of soft material having a thickness dependent upon the desired maximum projection of the particles from the working surface of the tool, partially embedding the particles in the layer by forcing them through said layer from said surface until edges of the particles lie flush with the opposite surface of the layer, bonding the portions of the abrasive particles exposed at said first surface of the layer in a solidified homogeneous body of metal which extends outwardly beyond said portions of the particles, and thereafter removing the soft layer to expose the portions of the particles previously enclosed thereby.

2. A method of making an abrasive tool which comprises distributing abrasive particles upon one surface of a layer of soft material having a thickness dependent upon the desired maximum projection of the particles from the working surface of the tool, partially embedding the particles in the layer by forcing them through the layer until edges of the particles lie flush with the opposite surface of the layer, bonding the portions of the abrasive particles exposed at said first surface of the layer in a solidified homogeneous body of metal which extends outwardly beyond said portions of the particles, and molding a tool body onto the surface of the body of metal which extends outwardly beyond said formerly exposed portions of the particles.

3. A method of making an abrasive tool which comprises distributing abrasive particles upon one surface of a layer of soft material having a thickness dependent upon the desired maximum projection of the particles from the working surface of the tool, partially embedding the particles in the layer by forcing them through the layer until edges of the particles lie flush with the opposite surface of the layer, bonding the portions of the abrasive particles exposed at said first surface of the layer in a solidified homogenous body of metal which extends outwardly from the layer of soft material beyond said portions of the particles, and molding a tool body onto the surface of the body of metal opposite to that which is in contact with the layer of soft material while said body of metal and the particles bonded therein still are in contact with said layer of soft material.

4. A method of making an abrasive tool which comprises forming a blank of hard metal, applying to a surface of said blank a layer of soft material of a thickness dependent upon the desired maximum projection of the particles beyond the working surface of the tool, distributing the abrasive particles upon the surface of the layer opposite that in contact with the blank, partially embedding the particles into said layer by forcing them through said layer until edges of the particles lie flush with the interface between said layer and the underlying blank, bonding the portions of the abrasive particles exposed at the surface of said layer to which the particles were applied in a solidified homogeneous body of metal which extends outwardly beyond said portions of the particles, and thereafter removing the soft layer to expose the portions of the particles previously enclosed thereby.

5. A method of making an abrasive tool which comprises forming a blank of hard metal, the blank having a surface of the shape and size of the working surface of the tool to be made, applying to said surface of the blank a layer of soft material of a thickness dependent upon the maximum desired projection of the particles beyond the working surface of the tool, distributing a layer of abrasive particles upon the surface of the layer of soft material opposite to that in contact with the blank, partially embedding the particles in the layer of soft material by forcing them thereinto until edges of the particles lie flush with the interface between said layer and the underlying blank, bonding the portions of the abrasive particles exposed at the surface of the layer of soft material onto which they were distributed in a solidified homogeneous body of metal which extends outwardly from the layer of soft material beyond said portions of the particles, and molding a tool body onto the surface of said body of metal opposite that in contact with the layer of soft material while the layer of soft material with the particles partially embedded therein still is in contact with the blank.

6. A method of making an abrasive tool which comprises forming a blank of hard metal having a surface of the shape and size of the working surface of the tool to be made, electro-depositing onto said surface of the blank a layer of relatively soft metal of a thickness dependent upon the maximum desired projection of the particles beyond the working surface of the tool, distributing a layer of abrasive particles upon the surface of the layer of soft metal opposite to that in contact with the blank, partially embedding the particles into the layer of soft metal by forcing them into said layer of soft metal until edges of the particles lie flush with the interface between said layer and the underlying blank, bonding the portions of the abrasive particles exposed beyond said layer in a solidified homogeneous body of metal which extends outwardly beyond said portions of the particles, and thereafter removing the soft layer of metal to expose the portions of particles previously enclosed thereby.

7. In a method of making an abrasive tool, the steps of embedding portions of abrasive particles to a uniform depth in a soft material, said depth corresponding to the desired maximum exposure of the particles from the working surface of the tool to be made, bonding the portions of the abrasive particles exposed beyond the soft material in a solidified homogeneous body of metal which extends outwardly beyond said portions of the particles, and removing the soft material to expose the portions of the particles previously embedded therein.

8. In a method of making an abrasive tool the steps of embedding portions of abrasive particles to a uniform depth in a relatively soft metal, said depth corresponding to the desired maximum exposure of the particles from the working surface of the tool to be made, bonding the portions of the abrasive particles exposed beyond the soft metal in a solidified homogeneous body of hard metal which extends outwardly beyond such portions of the particles, and molding a tool body onto the surface of the body of the hard metal which is outwardly beyond the portions enclosed by said body while the opposite face of the layer of bonding metal remains in contact with the layer of soft metal.

9. A method of making an abrasive tool which comprises preparing a layer of soft material, distributing abrasive particles upon one surface of said layer, partially embedding the abrasive particles in said layer by forcing them through said layer until edges of the particles lie flush with the opposite surface of said layer, applying a layer of metal to the face of the layer of soft material upon which the abrasive particles were distributed, the combined thickness of said layer of metal and the layer of soft material being equal to the desired maximum projection of the particles from the working surface of the tool to be made, but insufficient to completely enclose the particles, bonding the portions of the abrasive particles exposed at the side of said layer of metal opposite the layer of soft material in a solidified homogeneous body of metal which extends outwardly beyond said portions of the particles, and thereafter removing the layer of soft material and the first-applied layer of metal from the body of bonding metal to expose the portions of the particles previously enclosed by said layers.

10. A method of making an abrasive tool which comprises applying a layer of soft metal to a surface of a blank having the shape and size of the working surface of the tool to be made, distributing abrasive particles upon the surface of said layer opposite that in contact with the blank, partially embedding the particles in the layer of soft metal by forcing them through said layer until edges of the particles lie flush with the surface of the layer of soft metal in contact with the blank, applying a layer of a different metal to the face of the layer of soft metal through which the particles were forced, the combined thickness of the two layers of metal being equal to the desired maximum projection of the particles from the working surface of the tool, but insufficient to completely close the particles, bonding the portions of the abrasive particles exposed beyond the second-applied layer of metal in a solidified homogeneous body of a hard bonding metal which extends outwardly beyond said portions of the particles, molding a tool body onto the outer surface of the body of bonding metal while the layer of soft metal with portions of the particles embedded therein still is in contact with the blank, and thereafter removing both of said layers of metal from the body of bonding metal to expose the portions of the particles previously enclosed by them.

GEORGE F. KEELERIC.